United States Patent
Cooper

[11] 3,987,514
[45] Oct. 26, 1976

[54] DEVICE FOR REMOVING LIQUID AND SIMILAR MATTER FROM A SURFACE

[76] Inventor: David E. Cooper, 222 Lawndale Place, Michigan City, Ind. 46360

[22] Filed: May 16, 1975

[21] Appl. No.: 578,117

[52] U.S. Cl. .............................................. 15/409
[51] Int. Cl.² ........................................ A47L 5/16
[58] Field of Search ............ 15/405, 408, 409, 345, 15/346

[56] References Cited
UNITED STATES PATENTS

| 514,676 | 2/1894 | Furnas | 15/346 X |
| 751,786 | 2/1904 | Elston | 15/409 |
| 978,916 | 12/1910 | Matchette | 15/405 X |
| 3,287,755 | 11/1966 | Pansini | 15/345 X |

Primary Examiner—Christopher K. Moore
Attorney, Agent, or Firm—Oltsch & Knoblock

[57] ABSTRACT

An inverted channel member is placed over a surface having particulate or similar matter upon it. Air is forced through the channel member to create a vacuum within the member which causes the matter upon the surface to be picked up and blown from the surface and out the channel member.

7 Claims, 6 Drawing Figures

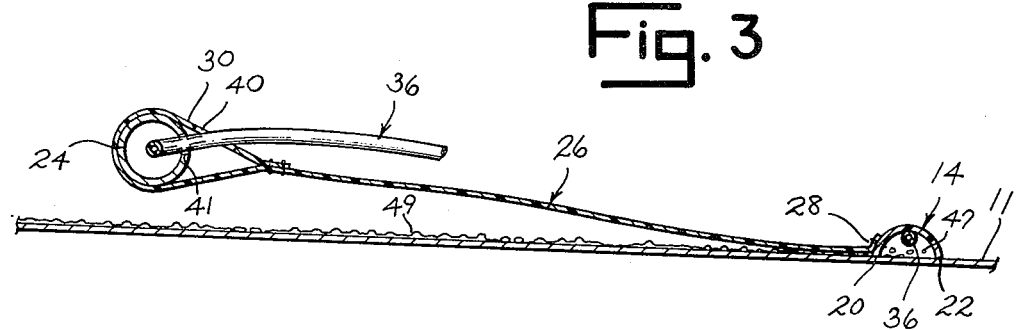
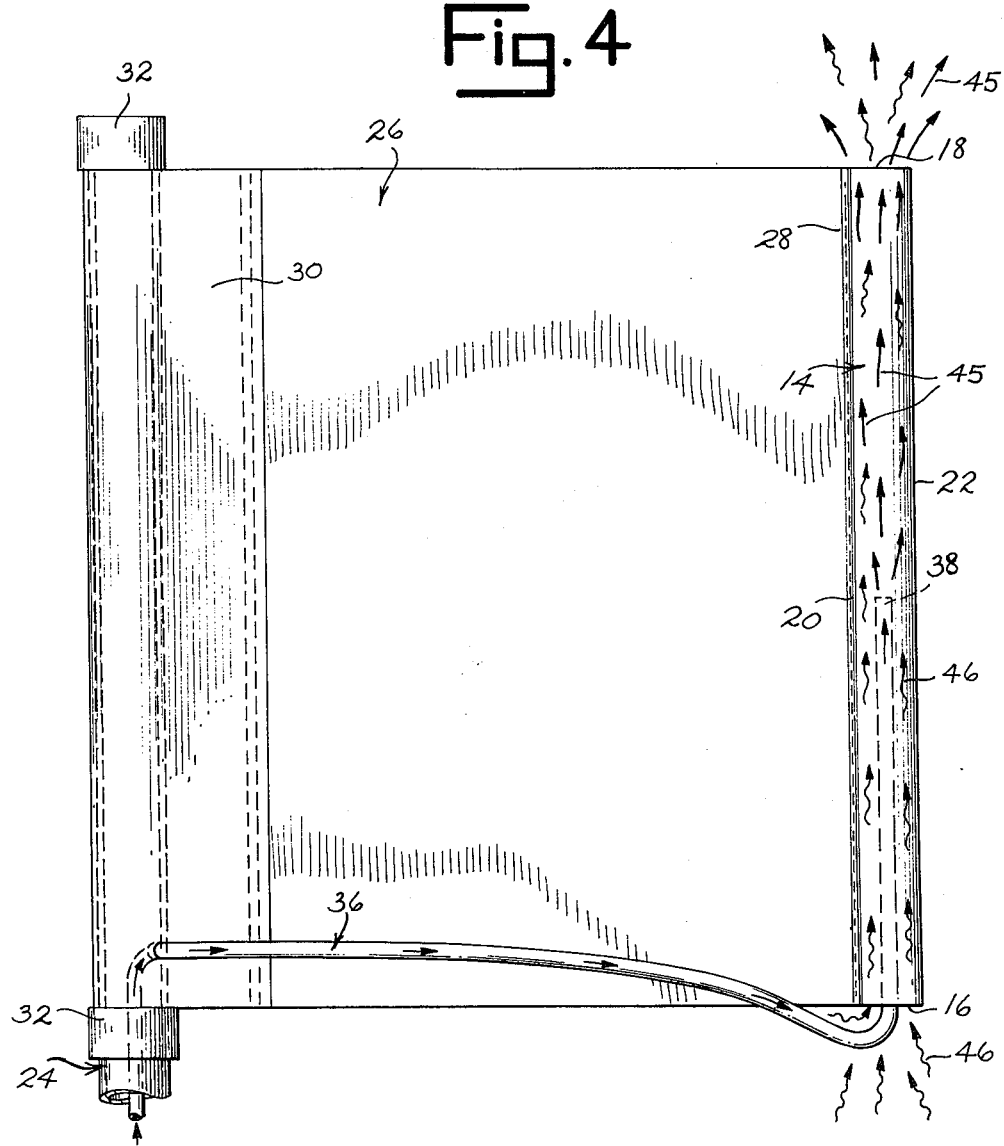

DEVICE FOR REMOVING LIQUID AND SIMILAR MATTER FROM A SURFACE

SUMMARY OF THE INVENTION

This invention relates to a device which is for removing matter from a surface and which will have specific but not limited application for drying a washed vehicle.

The device of this invention includes an elongated inverted channel member having an arch-shaped cross sectional configuration. The channel member includes opposite ends and two side edges which extend between its ends. The channel member is placed over and contacts the surface upon which particulate matter such as water stands. Air is forced through the channel member causing a vacuum to be formed within the member which in turn causes the matter thereon to be lifted and blown from the channel member. The channel member is moved relative to the surface with the matter being continuously lifted from the surface as it passes into the channel member.

Accordingly, it is an object of this invention to provide a device which is for removing matter such as liquid from a surface by means of air being forced through an inverted channel member contacting the surface.

Another object of this invention is to provide a device for removing water from the surface of a vehicle.

Still another object of this invention is to provide a device for removing liquid from a surface through the use of a vacuum created within an open ended channel member covering said surface and having an arch-shaped configuration.

Still another object of this invention is to provide an efficient means for removing liquid from a vehicle which has just been washed.

Other objects of this invention will become apparent upon a reading of the invention's description.

BRIEF DESCRIPTION OF THE DRAWINGS

FIG. 3 is a cross sectional view taken along line 3—3 of FIG. 2.

FIG. 4 is a detailed top plan view of the matter removal device shown in FIG. 1.

DESCRIPTION OF THE PREFERRED EMBODIMENTS

Figure 1:
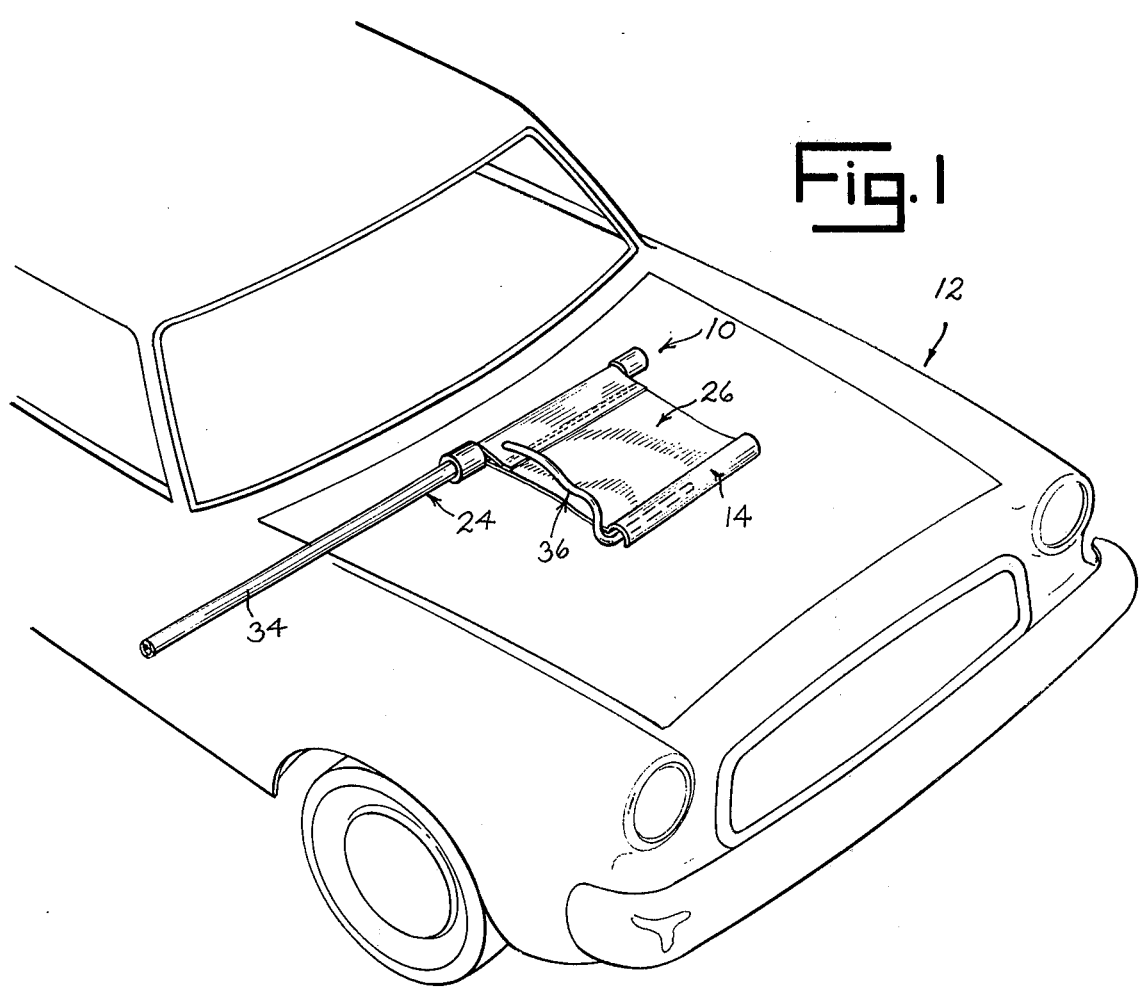
FIG. 1 is a perspective view of one embodiment of the matter removal device shown applied to the surface of an automobile for the purpose of removing water standing upon the surface.
Figure 2:
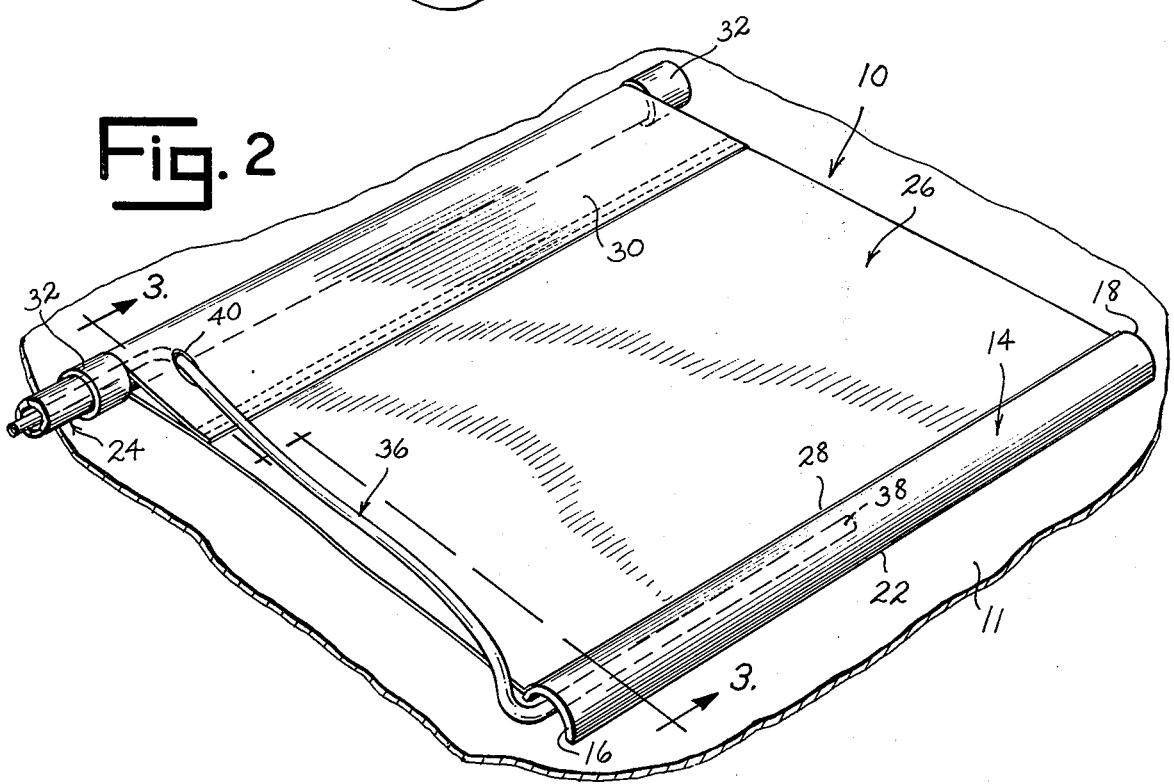
FIG. 2 is a detailed view of the matter removal device shown in FIG. 1.

The preferred embodiments illustrated are not intended to be exhaustive or to limit the invention to the precise forms disclosed. They have been chosen and described in order to best explain the invention and its application and practical use to thereby enable others skilled in the art to best utilize the invention.

The matter removal device 10 of FIGS. 1–4 is shown removing water from the surface 11 of a recently washed automobile 12. Device 10 includes an elongated inverted channel member 14 which, as best shown in FIG. 3, has an arch-shaped cross sectional configuration. Channel member 14 includes ends 16 and 18 and side edges 20 and 22. Channel member 14 as illustrated is formed of a flexible, shape retaining material, such as vinyl and has a semicircular cross section with the spacing between side edges 20 and 22 being ¾ inch and the length of the channel member being eleven inches. The thickness of the channel member is approximately 1/16 inch.

Channel member 14 is connected to a rigid rod or stay 24 by a flexible sheet part 26. Sheet part 26 preferably extends the length of channel member 14 with one end margin 28 being secured to channel member 14 alongside edge 20 and its opposite end margin 30 being looped about stay 24 and secured to itself. Stay 24 includes spaced shoulder parts 32 which contact the side edges of sheet part 26 to prevent the sheet part from slipping off the end of the stay. Stay 24 includes an extension part 34 which is best seen in FIG. 1 and which may be either hand held or suitably connected to a support which allows channel member 14 to be selectively placed in contact with the outer surface 11 of automobile 12. The type of support for stay 24 as well as whether such support is stationary or imparts movement to the stay and attached channel member will vary from construction and to construction of car washing mechanisms.

A tube 36 is connected between an air flow source (not shown) and channel member 14. One end portion 38 of tube 36 extends into end 16 of channel member 14 and terminates approximately mid-way along the length of the channel member. Tube portion 38 is attached such as by an adhesive or similar bonding agent to the inner wall of channel member 14. For the convenience of location, tube 36 extends across sheet part 26 and into aligned openings 40 in the sheet part and 41 in stay 24 and into the interior of the stay. Tube 36 passes through the interior of extension part 34 of the stay and is suitably connected at its opposite end portion to an air flow source, such as an air compressor or an air blower. In the illustrated embodiment, tube 36 is of a flexible vinyl composition having an internal diametrical opening of approximately 3/32 inch.

In operation, channel member 14 is placed in contact with surface 11 of automobile 12 at its side edges 20 and 22. Air is forced through tube 36, exiting at its end portion 38 within channel member 14. For the aforementioned sizes of channel member 14 and tube 36, compressed air under 100 p.s.i. pressure has been introduced into tube 36 with excellent drying results. As the air (indicated by solid line arrows 45 in FIG. 4) exits tube end portion 38 in a direction toward channel member end 18, it will flow outwardly from end 18 causing a reduced pressure to be formed within channel member 14. This reduction in pressure within channel member 14 causes side edges 20 and 22 of the channel member to be drawn into conforming contact with surface 11 of automobile 12. Also this low pressure formation within channel member 14 causes additional air (indicated by broken line arrows 46 in FIG. 4) to be drawn into the channel member through its end 16. As this combined air flow occurs through channel member 14 from end 16 to end 18, the water 47 upon automobile surface 11 within the channel member will be lifted and blown from the surface, and other surface water 49 will be drawn under the side edges 20 and 22 of the channel member. As automobile surface 11 moves relative to channel member 14, other water 49 upon the surface will enter channel member 14 and be blown from the surface out end 18 of the channel member. Whether channel member 14 is pulled across the surface 11 of the automobile or the automobile moves past channel member 14 is a matter of design choice in the construction of the car washing mechanism of which matter removal device 10 forms a part. The flexibility of channel member 14 allows the channel member side edges to conform to undulations in the automobile surface as the low pressure is formed within the channel member.

Figure 5:
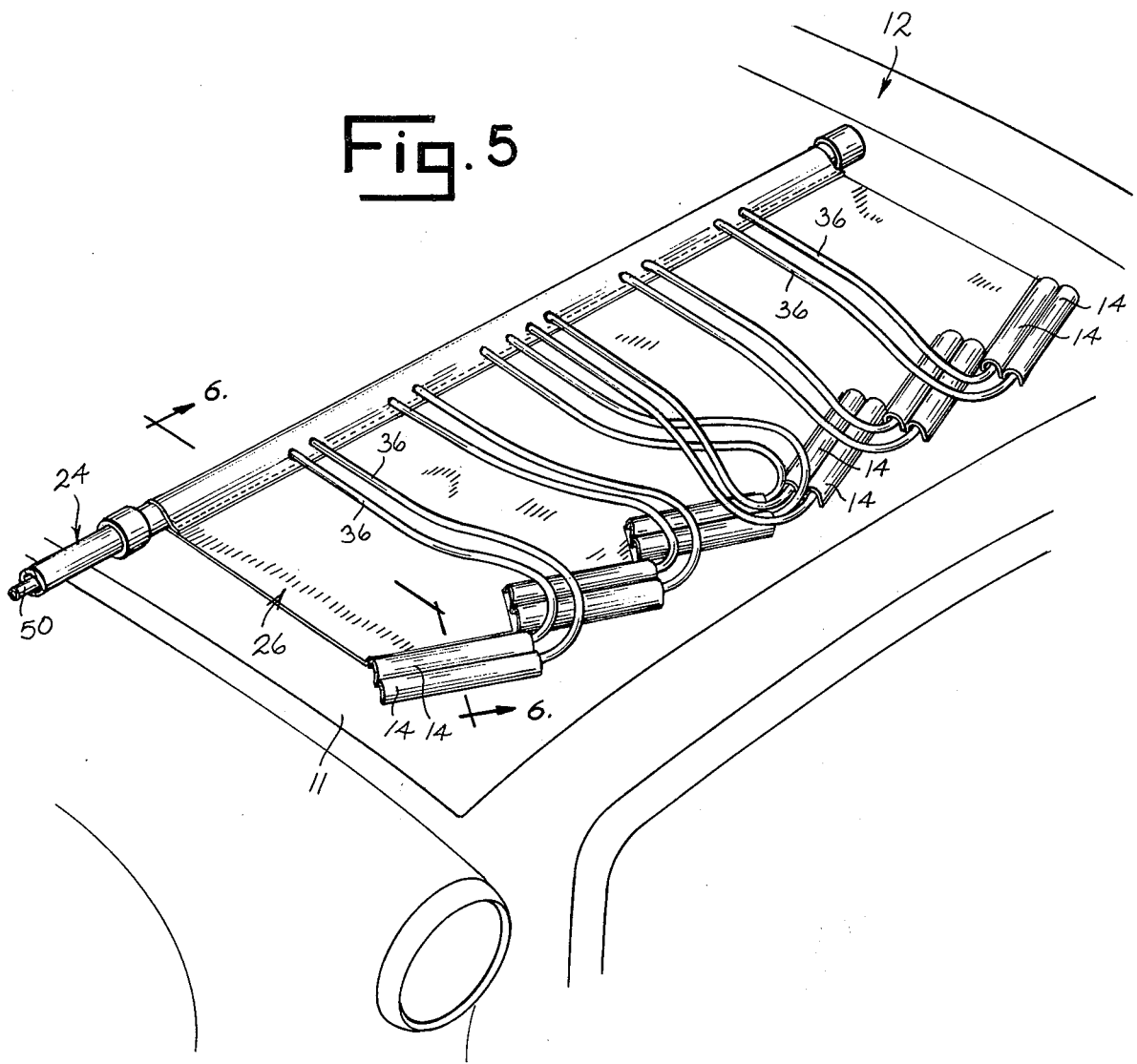
FIG. 5 is a perspective view of the matter removal device shown in modified form.
Figure 6:
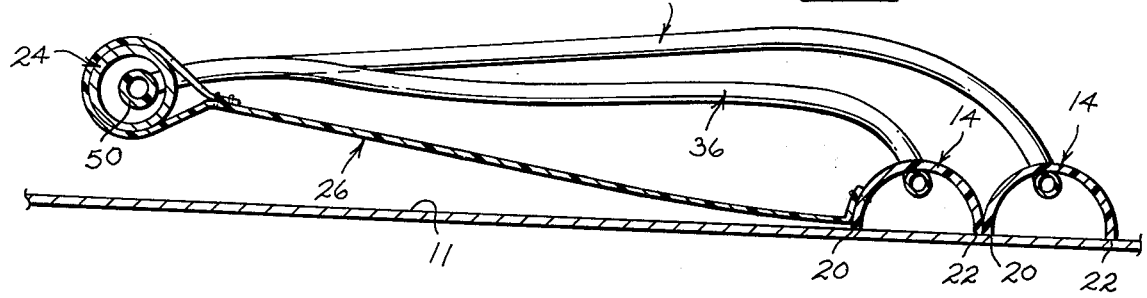
FIG. 6 is a cross sectional view taken along line 6—6 of FIG. 5.

It is contemplated that a plurality of channel members 14 can be arranged side by side to increase the efficiency and speed the drying process. As shown in FIGS. 5 and 6, such multiple paired channel members can be arranged in herringbone fashion to further facilitate the automobile drying process. In such a construction, sheet part 26 is attached to side edge 20 of one channel member 14 of each channel member pair while the opposite side edge 22 of the sheet part attached channel member is secured to the side edge 20 of the other channel member 14 of the pair. A separate tube 36 extending from a single manifold tube 50 connected to the air flow source is connected to each channel member 14 in the manner previously described for the embodiment shown in FIGS. 1–4. Water blown from the inside pairs of channel members 14 will be ejected across sheet part 26 above the next adjacent pair of channel members.

While the material removal devices shown in FIGS. 1–6 have been described as drying devices utilized for removing water from recently washed automobiles or similar vehicles, it is to be understood that the device of this invention would have application for removing other type liquids from various surfaces as well as for removing other particulate matter from surfaces. Additionally, a vented collection receptacle could be secured to end 18 of a channel member 14 for the purpose of collecting the ejected matter.

It is to be understood that the invention is not to be limited to the details above given but may be modified within the scope of the appended claims.

What I claim is:

1. A device for removing matter from a surface comprising an elongated inverted channel member having an arch-shaped cross sectional configuration, said channel member having opposite ends and first and second side edges extending between said ends, an air flow source, tube means for the conduction of air from said air source having one end associated with said air flow source and having its other end terminating within said channel member, said tube means other end being directed toward one of said channel member ends for directing air through said channel member and out said one channel member end, and means connected to said channel member for causing said channel member to contact said surface at the side edges of the channel member whereby said air flow through said channel member will cause the matter upon said surface between said side edges to be blown from the surface and out said channel member end.

2. The device of claim 1 wherein said channel member is of a flexible shape-retaining construction whereby said air flow directed by said tube means through said channel member causes the channel member side edges to be drawn into conforming contact with said surface.

3. The device of claim 2 wherein said tube means other end terminates mid-way between said channel member ends.

4. The device of claim 2 and including another channel member, said channel members positioned side by side and associated for joint contact with said surface at their respective side edges, said tube means constituting two tubes, each tube having one end associated with said air flow source and its other end terminating within a respective channel member and being directed toward one end of such channel member.

5. The device of claim 1 wherein said tube means extends into said channel member from its other end and extends longitudinally within said channel member.

6. The device of claim 1 wherein said means for causing said channel member to contact said surface includes a flexible sheet part having one of its end portions secured to said channel member and the other of its end portions secured to a means for imparting rigidity to the sheet part at its other end portion.

7. A device for removing water from the surface of a vehicle comprising an elongated inverted channel member having an arch-shaped cross sectional configuration, said channel member having opposite ends and first and second side edges extending between said ends, an air flow source, tube means for the conduction of air from said air source having one end associated with said air flow source and having its other end terminating within said channel member, said tube means other end being directed toward one of said channel member ends for directing said air through said channel member and out said one channel member end, and means connected to said channel member for causing said channel member to engage said surface at said channel members side edges whereby said air flow through said channel member will cause the water upon said surface between said side edges to be blown from the surface and out said one channel member end.

* * * * *